US012617027B2

(12) United States Patent
Lee et al.

(10) Patent No.: US 12,617,027 B2
(45) Date of Patent: May 5, 2026

(54) TWO-HOLE CORE DRILLING MACHINE

(71) Applicant: EGUN CO., LTD., Gwangju-si (KR)

(72) Inventors: Sung Jun Lee, Gwangju-si (KR); Chae Mun Lee, Seongnam-si (KR)

(73) Assignee: EGUN CO., LTD., Gwangju-si (KR)

( * ) Notice: Subject to any disclaimer, the term of this patent is extended or adjusted under 35 U.S.C. 154(b) by 573 days.

(21) Appl. No.: 17/928,883

(22) PCT Filed: Jul. 22, 2022

(86) PCT No.: PCT/KR2022/010838
§ 371 (c)(1),
(2) Date: Nov. 30, 2022

(87) PCT Pub. No.: WO2023/013942
PCT Pub. Date: Feb. 9, 2023

(65) Prior Publication Data
US 2025/0073953 A1     Mar. 6, 2025

(30) Foreign Application Priority Data

Aug. 2, 2021     (KR) ........................ 10-2021-0101219
Nov. 9, 2021     (KR) ........................ 10-2021-0152711

(51) Int. Cl.
*B23B 39/16*          (2006.01)
*B23B 51/04*          (2006.01)

(52) U.S. Cl.
CPC ............ *B23B 39/162* (2013.01); *B23B 51/04* (2013.01); *B23B 39/167* (2013.01); *Y10T 408/3811* (2015.01)

(58) Field of Classification Search
CPC ..... B23B 39/162; B23B 39/167; B23B 51/04; Y10T 408/38; Y10T 408/3811; Y10T 408/67
See application file for complete search history.

(56) References Cited

U.S. PATENT DOCUMENTS 1,083,696 A  *  1/1914  Nelson ................... B23B 39/162
                                                              74/665 R
2,499,657 A  *  3/1950  Linderme ............. B23B 39/162
                                                              74/665 R (Continued)

FOREIGN PATENT DOCUMENTS

AT          377221 B  *  2/1985  ............... B27C 9/04
CH          697003 A5 *  3/2008  ........... B23B 39/162

(Continued)

*Primary Examiner* — Eric A. Gates
(74) *Attorney, Agent, or Firm* — Fish IP Law, LLP; Tomas A. Prieto

(57)          ABSTRACT

A two-hole core drilling machine of the invention includes a body, a vertically reciprocating carriage vertically reciprocably mounted to the body, a fixing plate coupled to one side surface of the carriage, to rotatably support a drive shaft of a motor, a pivoting plate fastened to the fixing plate under a condition that a pivot angle of the pivoting plate is changed, a moving plate fastened to the pivoting plate under a condition that a length of the moving plate from the pivoting plate is varied, a belt or chain mounted between a drive pulley coupled to the drive shaft and a driven pulley coupled to a driven shaft rotatably mounted to the moving plate, a first core bit coupled to the drive shaft, and a second core bit coupled to the driven shaft.

9 Claims, 9 Drawing Sheets

(56)                    References Cited

U.S. PATENT DOCUMENTS

| | | | | | | |
|---|---|---|---|---|---|---|
| 2,884,818 | A | * | 5/1959 | Speckin | ............... | B23B 39/162 |
| | | | | | | 74/665 GA |
| 3,215,005 | A | * | 11/1965 | Miyakawa | ............ | B23B 39/162 |
| | | | | | | 408/124 |
| 4,365,916 | A | * | 12/1982 | Miyakawa | ............ | B23B 39/162 |
| | | | | | | 409/230 |
| 4,517,857 | A | * | 5/1985 | Miyakawa | ............ | B23B 39/162 |
| | | | | | | 409/230 |
| 7,059,812 | B2 | * | 6/2006 | McFarlane | ............ | B23B 39/162 |
| | | | | | | 408/124 |
| 2023/0167700 | A1 | * | 6/2023 | Lee | ....................... | B23B 39/167 |
| | | | | | | 175/58 |
| 2024/0286205 | A1 | | 8/2024 | Lee | | |

FOREIGN PATENT DOCUMENTS

| | | | | | | |
|---|---|---|---|---|---|---|
| CN | 103909285 | A | * | 7/2014 | ............ | B23Q 5/261 |
| CN | 104625144 | A | * | 5/2015 | ........... | B23B 39/162 |
| CN | 105234447 | A | * | 1/2016 | .............. | B23Q 7/08 |
| CN | 112475352 | A | * | 3/2021 | ............ | B23B 47/30 |
| DE | 127670 | C | | 1/1901 | | |
| DE | 1115098 | B | * | 10/1961 | | |
| DE | 2701516 | A1 | * | 7/1978 | | |
| FR | 642926 | A | * | 9/1928 | | |
| FR | 1205667 | A | * | 2/1960 | | |
| FR | 2044897 | A5 | * | 2/1971 | | |
| FR | 2568802 | A1 | * | 2/1986 | ........... | B23B 39/162 |
| FR | 2655896 | A1 | * | 6/1991 | ........... | B23B 39/162 |
| JP | S486693 | U | | 6/1971 | | |
| JP | S6029607 | U | | 8/1983 | | |
| JP | 6029607 | U | | 2/1985 | | |
| JP | S62152605 | A | | 7/1987 | | |
| JP | H05260731 | A | | 10/1993 | | |
| JP | 2001105211 | A | | 4/2001 | | |
| JP | 2005179243 | | | 1/2006 | | |
| JP | 2006015479 | A | | 1/2006 | | |
| KR | 102360421 | B1 | | 2/2002 | | |
| KR | 101302141 | | | 8/2013 | | |
| KR | 101302141 | B1 | | 8/2013 | | |
| NL | 9301721 | A | * | 5/1995 | ........... | B25H 1/0078 |
| WO | 9216326 | | | 10/1992 | | |

* cited by examiner

TWO-HOLE CORE DRILLING MACHINE

TECHNICAL FIELD

The present invention relates to a core drilling machine, and more particularly to a two-hole core drilling machine.

BACKGROUND ART

A core drilling machine is a mechanical apparatus for drilling a hole into a wall, a ceiling, etc. upon piping construction in a building. Generally, such a core drilling machine constitutes a core drill assembly together with various devices configured to manipulate a core drill.

A general core drill assembly, which is currently used, includes a base fixed to a structure, into which a hole is to be drilled, by an anchor bolt, a stand disposed to be perpendicular to the base and formed with a rack at one side surface thereof, a driving body with a pinion mounted therein, the driving body being vertically reciprocable along the stand in accordance with a rotating operation of a handle, and a core drill mounted to the driving body and configured to drill a hole into a particular portion of the structure. Here, the core drill is constituted by a core bit configured to drill a hole into the structure through frictional contact between the core bit and the structure, and a drive motor configured to rotate the core bit at a high speed.

The core drill assembly having the above-mentioned configuration operates as follows. When the handle installed at the driving body is rotated in a state in which the base is fixed to a wall or a bottom surface of the structure using a plurality of anchor bolts, the pinion of the driving body, which engages with the rack of the stand, moves along the rack. As a result, the driving body reciprocates vertically along the stand. In this state, when electric power is applied to the drive motor, the core bit is rotated. The core bit, which rotates at a high speed, drills a hole into the structure while moving forwards.

However, such a conventional core drilling machine performs drilling using only one core bit mounted thereto. For this reason, for drilling of a plurality of holes, the core drilling machine should be moved to hole positions one by one, and tasks for fixing the core drilling machine using anchor bolts and drilling a hole should be performed for the hole positions one by one. As a result, there are problems in that work is troublesome, and a lot of time is taken.

In particular, in a working environment in a large-scale factory requiring rapid drilling of a number of holes, use of only the conventional core drilling machine may cause a problem in that high costs are taken because a number of workers should be committed, in addition to a problem of an increased working time.

The present invention proposes a two-hole core drilling machine in order to solve the above-mentioned problems.

DISCLOSURE

Technical Problem

It is an object of the present invention to provide a two-hole core drilling machine.

Technical Solution

In accordance with an aspect of the present invention, the above and other objects can be accomplished by the provision of a two-hole core drilling machine including a body, a vertically reciprocating carriage vertically reciprocably mounted to the body, a fixing plate coupled to one side surface of the carriage, to rotatably support a drive shaft of a motor, a pivoting plate fastened to the fixing plate under a condition that a pivot angle of the pivoting plate is changed, a moving plate fastened to the pivoting plate under a condition that a length of the moving plate from the pivoting plate is varied, a belt or chain mounted between a drive pulley coupled to the drive shaft and a driven pulley coupled to a driven shaft rotatably mounted to the moving plate, a first core bit coupled to the drive shaft, and a second core bit coupled to the driven shaft. The body may include a base fixed to a structure to be drilled, and a stand vertically coupled to the base and formed with a gear at one side surface thereof. The carriage may be provided with a pinion engaged with the gear, and may be vertically reciprocably mounted to the stand. The fixing plate may include a pivot guide slit formed through the fixing plate while having an arc shape. The pivoting plate may include a plurality of fastening holes formed to extend vertically through the pivoting plate. The pivoting plate may be fixed at a predetermined pivot position with respect to the fixing plate by fasteners fastened to the plurality of fastening holes and the pivot guide slit. The pivoting plate may include a movement guide slit formed lengthily in a longitudinal direction. The moving plate may include a plurality of fastening holes formed to extend vertically through the moving plate. The moving plate may be fixed at a predetermined position in a longitudinal direction with respect to the pivoting plate by fasteners fastened to the plurality of fastening holes and the movement guide slit. The moving plate may further include a tension roller configured to be fixed after a rotation shaft of the tension roller moves toward the belt or chain loosened in accordance with movement of the moving plate, thereby applying tension to the belt or chain. Water supply hoses may be connected to lower portions of the drive shaft and the driven shaft, respectively, to supply cooling water. The gear may include a rack.

In accordance with another aspect of the present invention, there is provided a two-hole core drilling machine including a body, a vertically reciprocating carriage vertically reciprocably mounted to the body, a motor coupled to one side surface of the carriage, a fixing plate coupled to one side of a lower portion of the carriage, to rotatably support a drive shaft of the motor, a pivoting plate fastened to the fixing plate under a condition that a pivot angle of the pivoting plate is changed, a moving plate fastened to the pivoting plate under a condition that a distance of the moving plate from the fixing plate is varied, a driven shaft being rotatably mounted to the moving plate, a gear train coupled between the drive shaft and the driven shaft, to transmit rotation force of the drive shaft to the driven shaft, a first core bit coupled to the drive shaft, and a second core bit coupled to the driven shaft.

The body may include a base fixed to a structure to be drilled, and a stand vertically coupled to the base and formed with a gear at one side surface thereof. The carriage may be provided with a pinion (for example, a hydraulic cylinder) (for convenience of description, referred to as a "pinion") engaged with the gear, and may be vertically reciprocably mounted to the stand. The fixing plate may include a plurality of fastening holes arranged on a circumference having a predetermined radius from the drive shaft. The pivoting plate may include a plurality of fastening holes extending vertically through the pivoting plate. The pivoting plate may be fixed at a predetermined pivot position with respect to the fixing plate by fasteners fastened through the plurality of fastening holes of the fixing plate and the plurality of fastening holes of the pivoting plate. The pivoting plate may include a plurality of slots lengthily formed in a longitudinal direction. The moving plate may include a plurality of fastening holes formed to extend vertically through the moving plate. The moving plate may be fixed at a predetermined position in a longitudinal direction with respect to the pivoting plate by fasteners fastened to the plurality of fastening holes and the plurality of slits. The gear train may include a first link bracket pivotably mounted to the drive shaft, a second link bracket pivotably connected, at one end thereof, to the first link bracket while being pivotably mounted, at the other end thereof, to the driven shaft, a drive gear coupled to the drive shaft, to be rotatable by the drive shaft, a first intermediate gear mounted to the first link bracket while engaging with the drive gear, a second intermediate gear mounted to connection portions of the first link bracket and the second link bracket while engaging with the first intermediate gear, a third intermediate gear mounted to the first link bracket while engaging with the second intermediate gear, and a driven gear coupled to the driven shaft while engaging with the third intermediate gear, to be rotatable by the third intermediate gear. Water supply hoses may be connected to a middle portion of the drive shaft and an upper portion of the driven shaft, respectively, to supply cooling water. A guide groove configured to guide movement of the moving plate may be formed at an upper surface of the pivoting plate. A protrusion may be formed at a side surface of the moving plate, and a groove engaging with the protrusion may be formed in a longitudinal direction at the pivoting plate, to prevent separation of the moving plate.

Advantageous Effects

In accordance with the two-hole core drilling machine of the exemplary embodiment of the present invention, it may be possible to simultaneously drill two holes by simultaneously rotating the two core bits.

In addition, in the two-hole core drilling machine of the exemplary embodiment of the present invention, the relative pivot angle between the two core bits and the distance between the two core bits may be adjusted and, as such, it may be possible to easily simultaneously drill two holes while appropriately adjusting the distance between the two holes to be drilled within a predetermined range.

BEST MODE

Figure 1:
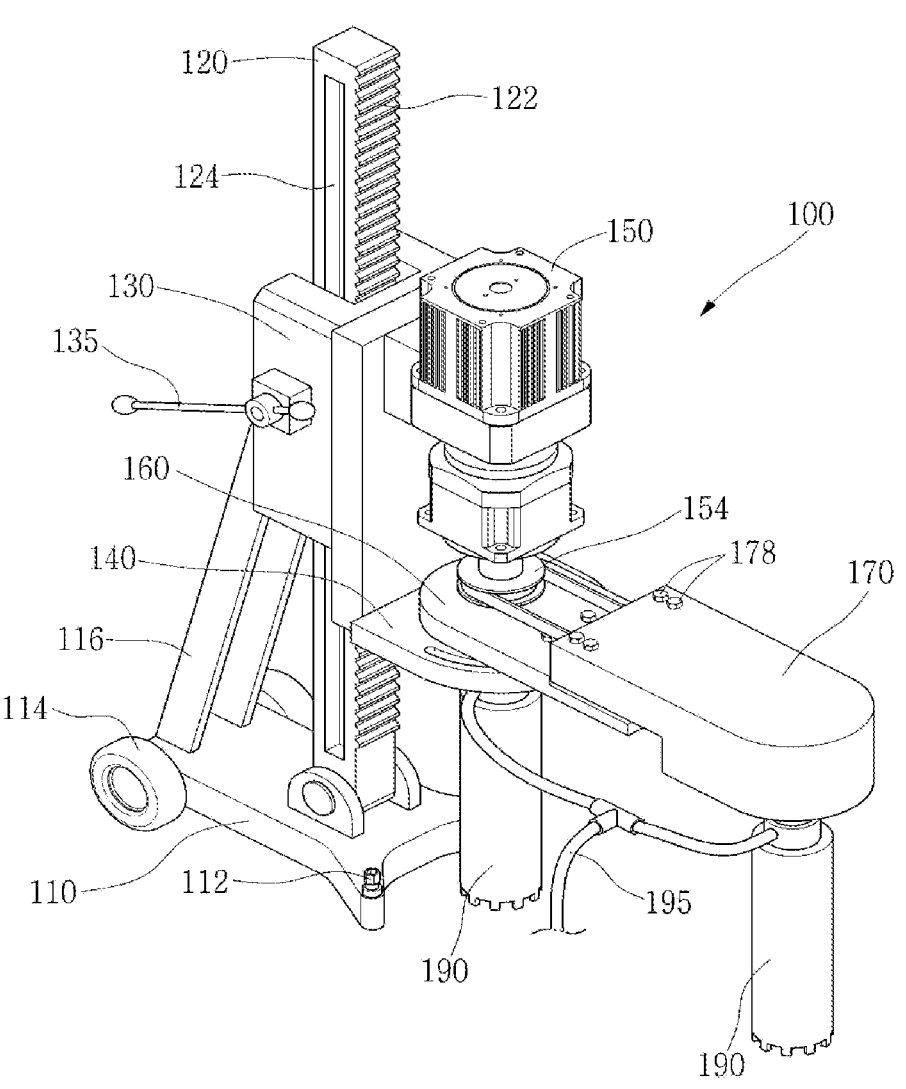
FIG. 1 is a perspective view schematically showing a two-hole core drilling machine according to an exemplary embodiment of the present invention.

Embodiments may be variously varied and may have various forms. In connection with this, specific embodiments will be illustrated in the drawings, and will be described in detail in the specification, but embodiments should not be construed as limited to the specific embodiments. It is to be appreciated that all changes, equivalents, and substitutes that do not depart from the spirit and technical scope of the embodiments are encompassed in the embodiments.

It should be noted that the terms used herein are merely used to describe a specific embodiment, not to limit the present invention. Incidentally, unless clearly used otherwise, singular expressions include a plural meaning. In this application, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Hereinafter, embodiments of the present disclosure will be described in detail with reference to the accompanying drawings. It is noted that the same reference numerals in the drawings designate the same constituent elements, respectively. When the detailed description of the relevant known function or configuration is determined to unnecessarily obscure the gist of the present invention, the detailed description will be omitted. For similar reasons, in the accompanying drawings, a part of constituent elements is exaggerated, omitted, or schematically illustrated.

Embodiment 1

Figure 2:
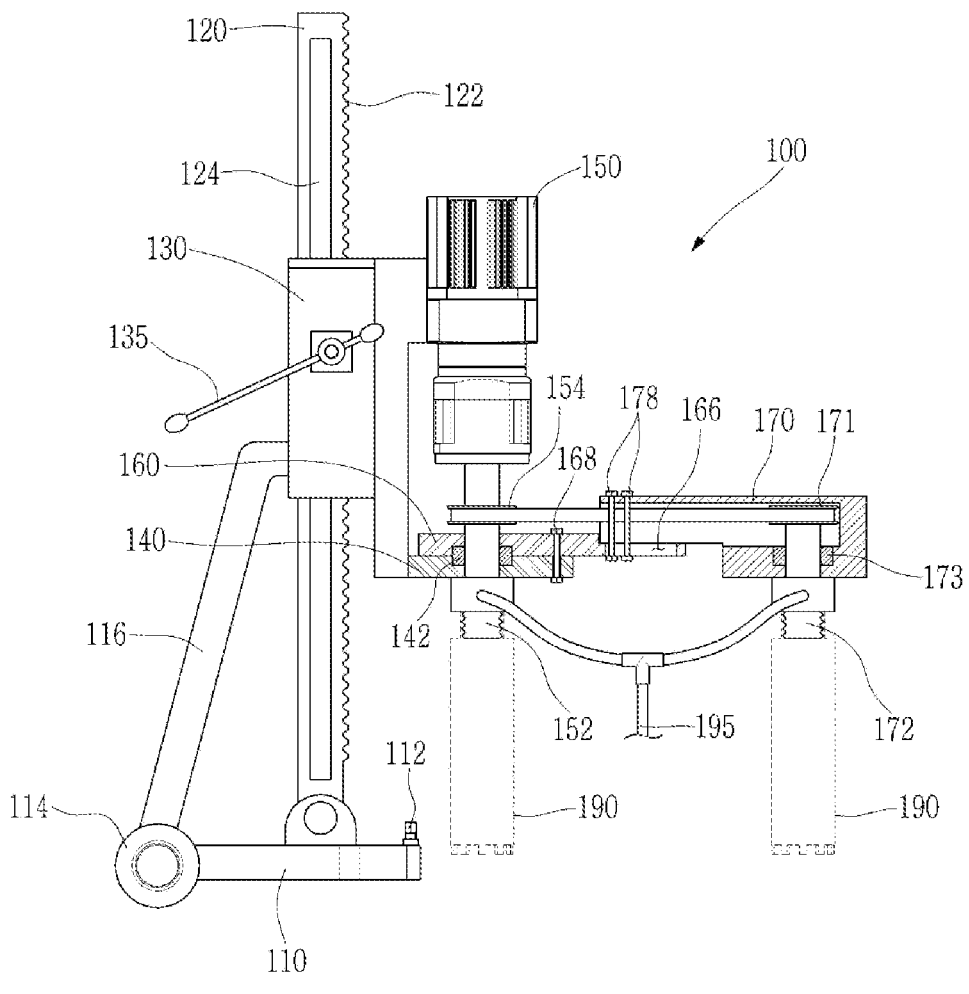
FIG. 2 is a front view schematically showing an inner structure of the two-hole core drilling machine according to the exemplary embodiment of the present invention.

FIG. 1 is a perspective view schematically showing a two-hole core drilling machine according to an exemplary embodiment of the present invention. FIG. 2 is a front view schematically showing an inner structure of the two-hole core drilling machine according to the exemplary embodiment of the present invention.

The two-hole core drilling machine according to the exemplary embodiment of the present invention, which is designated by reference numeral "100", includes a base 110 fixed to a structure to be drilled (for example, a concrete floor, etc.), a stand 120 vertically coupled to the base 110 and formed with a gear (for example, a rack) 122 at one side surface thereof, a vertically reciprocating carriage 130 provided with a pinion engaged with the rack 122 and vertically reciprocably mounted to the stand 120, a fixing plate 140 coupled to one side surface of the carriage 130, to rotatably support a drive shaft 152 of a motor 150, a pivoting plate 160 fastened to the fixing plate 140 under the condition that a pivot angle of the pivoting plate 160 is changed, and a moving plate 170 fastened to the pivoting plate 160 under the condition that an extension length of the moving plate 170 is varied. The two-hole core drilling machine 100 also includes a belt 175 mounted between a drive pulley 154 coupled to the drive shaft 152 and a driven pulley 171 coupled to a driven shaft 172 rotatably mounted to the moving plate 170, a first core bit 190 coupled to the drive shaft 152, and a second core bit 190 coupled to the driven shaft 172.

Among the constituent elements of the two-hole core drilling machine 100 according to the exemplary embodiment of the present invention, the base 110 and the stand 120 may be collectively referred to as a "body".

The two-hole core drilling machine 100 is a core drilling machine configured to drill a hole into a horizontal bottom, a wall, or an inclined or curved surface having various shapes in a concrete structure.

The base 110 is provided with at least one pair of anchor bolts 112 therein and, as such, may be fixed to a surface of a structure. Although the anchor bolts 112 are shown in FIG. 1 as being disposed at opposite ends of the base 110, a hole may be disposed at a central portion of the base 110, and an anchor bolt 112 may be fixed to a surface of the structure through the hole. In addition, the base 110 is provided with at least one pair of wheels 114 and, as such, the entirety of the two-hole core drilling machine 100 may be easily movable.

The stand 120 is vertically coupled to the base 110. The stand 120 may be formed to have a rectangular column shape. A connecting frame 116 may be coupled between a middle portion of the stand 120 and the base 110, to support the stand 120 with respect to the base 110. The rack 122 may be formed at one side surface of the stand 120, to vertically reciprocate the carriage 130 mounted to the stand 120.

The carriage 130 may be provided with the pinion (not shown) engaged with the rack 122 and, as such, may be vertically reciprocably mounted to the stand 120. The carriage 130 may be provided with a lever 135 configured to rotate the pinion. Accordingly, upon operating the drilling machine 100, the operator may rotate the lever 135, thereby vertically reciprocating the carriage 130. In addition, guide grooves 124 may be formed at opposite side surfaces of the stand 120, respectively, to guide and support vertical reciprocation of the carriage 130.

The motor 150 may be coupled to an upper portion of one side surface of the carriage 130, and the fixing plate 140 may be coupled to a lower portion of the side surface of the carriage 130. The motor 150 may be, for example, an electric motor, and the drive shaft 152 thereof may be rotatably supported by a bearing 142 mounted to the fixing plate 140.

The pivoting plate 160 may be mounted to an upper surface of the fixing plate 140 such that the pivoting plate 160 is pivotable about the drive shaft 152. The pivoting plate 160 may be fixed to the fixing plate 140 by a fastener under the condition that a pivot angle of the pivot plate 160 is changed.

In addition, the moving plate 170 may be mounted to an upper surface of a front portion of the pivoting plate 160 under the condition that a relative position of the moving plate 170 with respect to the pivoting plate 160 in a longitudinal direction is varied, in order to vary an extension length of the moving plate 170. The driven shaft 172 may be rotatably mounted to the moving plate 170 by means of a bearing 173.

The drive pulley 154 may be coupled to the drive shaft 152, and the driven pulley 171 may be coupled to the driven shaft 172. The belt 175 is connected to the drive pulley 154 and the driven pulley 171 and, as such, the motor 150 may simultaneously rotate the drive shaft 152 and the driven shaft 172. In this case, the first core bit 190 is configured to be fixed, whereas the second core bit 190 may be configured to be rotatable in left and right directions such that the second core bit 190 has a desired rotation angle.

Meanwhile, a chain may be connected in place of the belt 175. In this case, a drive sprocket and a driven sprocket may be connected to the chain, in place of the drive pulley 154 and the driven pulley 171.

The first core bit 190 may be coupled to a lower end of the drive shaft 152, and the second core bit 190 may be coupled to a lower end of the driven shaft 172. The first core bit 190 and the second core bit 190 may have the same size. However, two core bits having various and different sizes, may be coupled to the drive shaft 152 and the driven shaft 172, respectively.

In the two-hole core drilling machine 100 according to the exemplary embodiment of the present invention, the first core bit 190 and the second core bit 190 may be provided to be fixed in a state in which pivot angle positions of the first core bit 190 and the second core bit 190 with respect to the base 110 and a relative length between the first core bit 190 and the second core bit 190 are adjusted. Thus, the two-hole core drilling machine 100 may simultaneously drill two holes in a state in which a relative pivot angle and a relative length between the two holes are appropriately adjusted.

Figure 3:
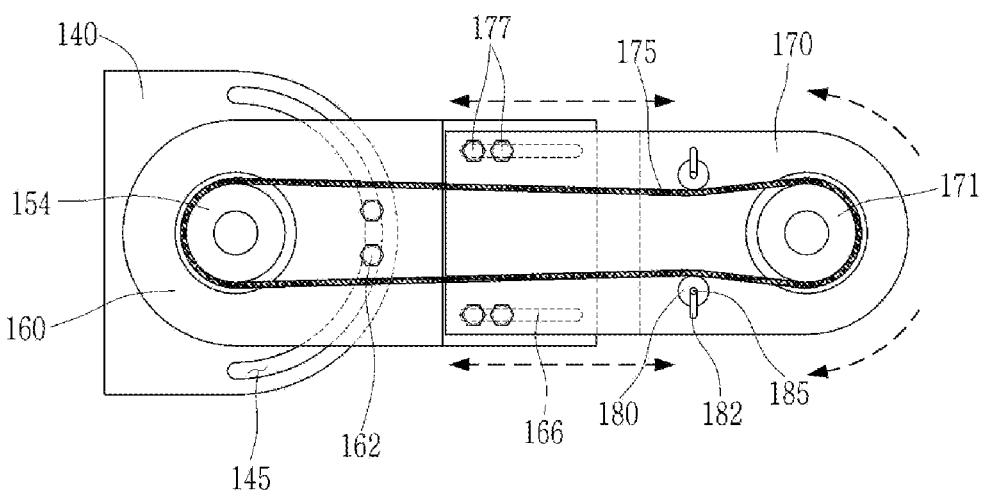
FIG. 3 is a top view showing a pivot angle and length adjusting structure of the two-hole core drilling machine.
Figure 4:
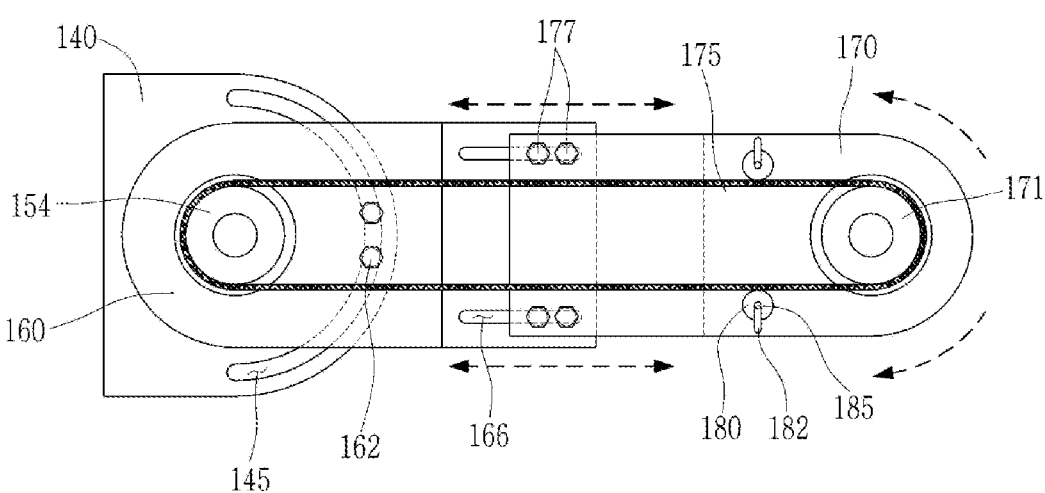
FIG. 4 is a top view showing a state in which the moving plate is coupled to the fixing plate after moving with respect to the fixing plate from a state of FIG. 3.

FIG. 3 is a top view showing a pivot angle and length adjusting structure of the two-hole core drilling machine. FIG. 4 is a top view showing a state in which the moving plate is coupled to the fixing plate after moving with respect to the fixing plate from a state of FIG. 3.

The fixing plate 140 may be formed to take the form of a rectangular plate having an arc shape at one side thereof. Linear sides of the fixing plate 140 may be coupled to the carriage 130 and, as such, the fixing plate 140 may be vertically reciprocable together with the carriage 130. A pivot guide slit 145 having an arc shape may be formed through the fixing plate 140 near an edge of the arc-shaped side of the fixing plate 140.

The pivoting plate 160 may be mounted to the upper surface of the fixing plate 140 such that the pivoting plate 160 is pivotable about the drive shaft 152 concentric with the fixing plate 140. The pivoting plate 160 may be formed to have a rectangular shape in which one side thereof facing the carriage 130 is formed to have an arc shape, and the other side thereof extends lengthily beyond the arc-shaped side of the fixing plate 140. A pair of fastening holes 162 is formed through the pivoting plate 160 at positions corresponding to the pivot guide slit 145 of the fixing plate 140 such that the fastening holes 162 extend vertically through the pivoting plate 160.

As shown in FIG. 2, it may be possible to fix the pivoting plate 160 on the fixing plate 140 at a predetermined pivot position by fastening fasteners 168 constituted by bolts and nuts through the pair of fastening holes 162 of the pivoting plate 160 and the pivot guide slit 145 of the fixing plate 140.

As shown in FIGS. 2 and 3, the pivoting plate 160 may be provided with a pair of movement guide slits 166 formed lengthily in a longitudinal direction. The pair of movement guide slits 166 may be formed through the pivoting plate 160 in parallel to have a predetermined length. A portion of the pivoting plate 160 overlapping with the moving plate 170 may have a reduced thickness and, as such, the pivoting plate 160 may be formed to have a step. In this case, the pair of movement guide slits 166 may be formed at the stepped thin portion of the pivoting plate 160, and a limit position of the moving plate 170, at which movement of the moving plate 170 toward the pivoting plate 160 is limited by the step, may be set.

The moving plate 170 may be provided with two pairs of fastening holes 177 formed through the moving plate 170 at positions corresponding to the pair of movement guide slits 166. In the case in which an upper surface of the pivoting plate 160 at one side of the pivoting plate 160 is formed to be stepped, the moving plate 170 may also have a reduced thickness at one side thereof and, as such, a lower surface of the moving plate 170 at the side of the moving plate 170 may be formed to be stepped. The moving plate 170 may be formed to have a plate shape, and a cover may be coupled to the moving plate 170 in order to cover the bearing 173, the driven pulley 171, and the belt 175 mounted on the moving plate 170. Alternatively, the plate and the cover are coupled to each other to be integrated and, as such, the moving plate 170 may be configured in the form of a case. In the latter case, a plurality of fastening holes 177 may be formed to extend through upper and lower surfaces of the moving plate 170 having the form of a case.

As shown in FIGS. 2 to 4, it may be possible to fix the moving plate 170 with respect to the pivoting plate 160 at a predetermined position in a longitudinal direction by fastening fasteners 178 through the plurality of fastening holes 177 of the moving plate 170 and the pair of movement guide slits 166 of the pivoting plate 160. The fasteners 178 are constituted by bolts and nuts, and the two pairs of fastening holes 177 may be disposed outside the belt 175 in a width direction, in order to prevent the belt 175 from interfering with the bolts.

As shown in FIGS. 3 and 4, it is preferred that the moving plate 170 further include a tension roller 180 configured to adjust tension of the belt or chain 175 in such a manner that a rotation shaft of the tension roller 180 applies tension to the belt or chain 175 loosened in accordance with movement of the moving plate 170 in a state of being fixed after moving toward the belt or chain 175. The following description will be given in conjunction with an example in which the belt 175 is used. Although the tension roller 180 is shown in FIGS. 3 and 4 as being disposed at opposite outsides of the belt 175 in a width direction, it is more preferred that the tension roller 180 be disposed alone at one outside of the belt 175. That is, only one tension roller 180 may be provided. In particular, although the tension roller 180 is shown in FIGS. 3 and 4 as being disposed at the outsides of the belt 175 in the width direction in a lower region where the moving plate 170 is disposed, the tension roller 180 may be disposed at the outsides of the belt 175 in the width direction in an upper region where the fixing plate 1400 is disposed. In addition, although not shown in FIGS. 3 and 4, a fixed roller may be provided at a right side of the movement guide slits 166 and an outside of the belt 175 in the width direction in the lower region when viewed in FIGS. 3 and 4, such that the belt 175 passes the fixed roller.

When the moving plate 170 is fastened in a state in which the moving plate 170 is disposed far from the pivoting plate 160, as shown in FIG. 4, the distance between the drive pulley 154 and the driven pulley 171 is increased. In this case, loosening of the belt 175, which has a constant length, is relatively decreased.

On the other hand, when the moving plate 170 is fastened in a state in which the moving plate 170 is disposed nearer to the pivoting plate 160, as shown in FIG. 3, the distance between the drive pulley 154 and the driven pulley 171 is decreased. In this case, loosening of the belt 175, which has a constant length, is relatively increased. To this end, the loosened belt 175 should be tensioned so that the belt 175 may transmit rotation force of the drive shaft 152 to the driven shaft 172.

For this reason, the moving plate 170 may be provided with at least one tension roller 180 configured to push the belt 175 disposed over the moving plate 170 in a direction from an outside of the belt 175 to an inside of the belt 175 in the width direction. A pair of slits 182 extending in the width direction may be formed through the moving plate 170, and rotation shafts 185 of tension rollers 180 may be firmly fastened to the slits 182 after being moved to appropriate positions in the slits 182, respectively.

Although the belt 175 may be loosened in accordance with movement of the moving plate 170 with respect to the pivoting plate 160, the belt 175 may be kept tensioned as the tension rollers 180 are fastened after being moved and, as such, rotation force may be smoothly transmitted.

Meanwhile, water supply hoses 195 may be connected to lower portions of the drive shaft 152 and the driven shaft 172, respectively, to supply cooling water. That is, the two-hole core drilling machine 100 according to the exemplary embodiment of the present invention may be a wet core drilling machine configured to drill two holes by simultaneously rotating a plurality of core bits 190 while supplying water.

The water supply hoses 195 are detachably connected to a water supply pipe provided with a valve, and may be connected in parallel in order to supply water along channels communicating with interiors of respective core bits 190 after passing through interiors of the drive shaft 152 and the driven shaft 172. Since the distance between the drive shaft 152 and the driven shaft 172 is variable, the water supply hoses 195 connected between the drive shaft 152 and the driven shaft 172 may be formed of a flexible material and may be connected while having a sufficient length.

In accordance with the two-hole core drilling machine of the exemplary embodiment of the present invention, it may be possible to simultaneously drill two holes by simultaneously rotating the two core bits.

In addition, the relative pivot angle between the two core bits and the distance between the two core bits may be adjusted and, as such, it may be possible to easily simultaneously drill two holes while appropriately adjusting the distance between the two holes to be drilled within a predetermined range.

Embodiment 2

Figure 5:
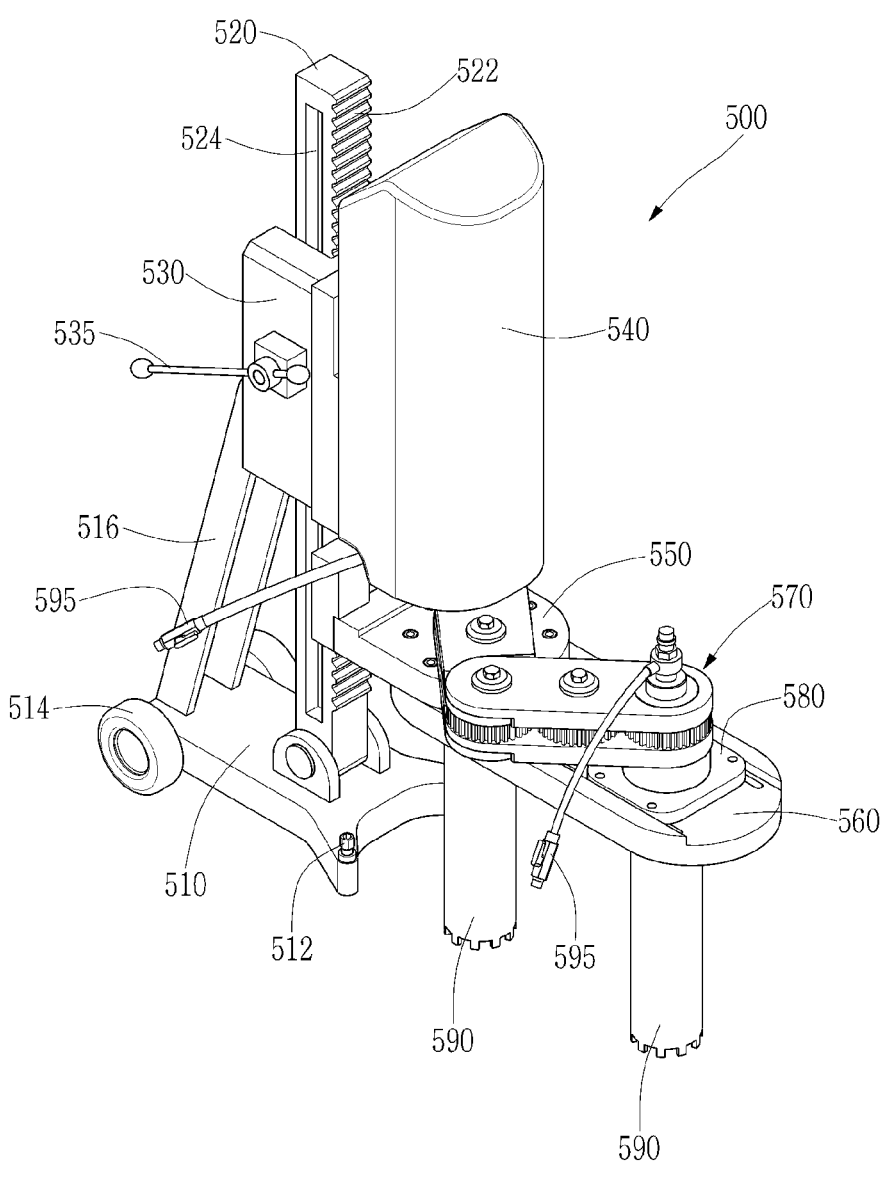
FIG. 5 is a perspective view schematically showing an improved two-hole core drilling machine according to an exemplary embodiment of the present invention.
Figure 6:
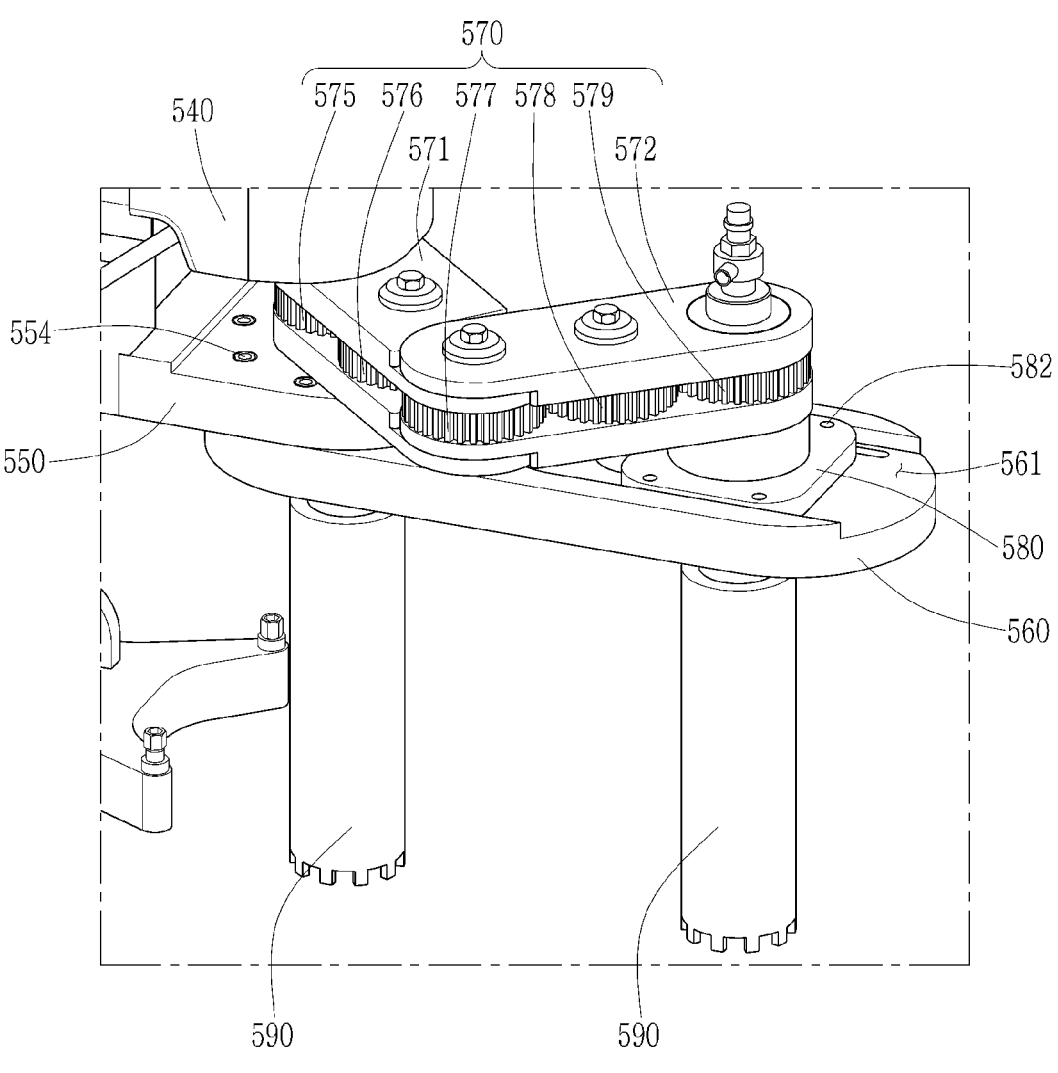
FIG. 6 is a partial perspective view showing a structure configured to adjust the distance between two core bits and a rotation force transmission structure in the improved two-hole core drilling machine according to the exemplary embodiment of the present invention.
Figure 7:
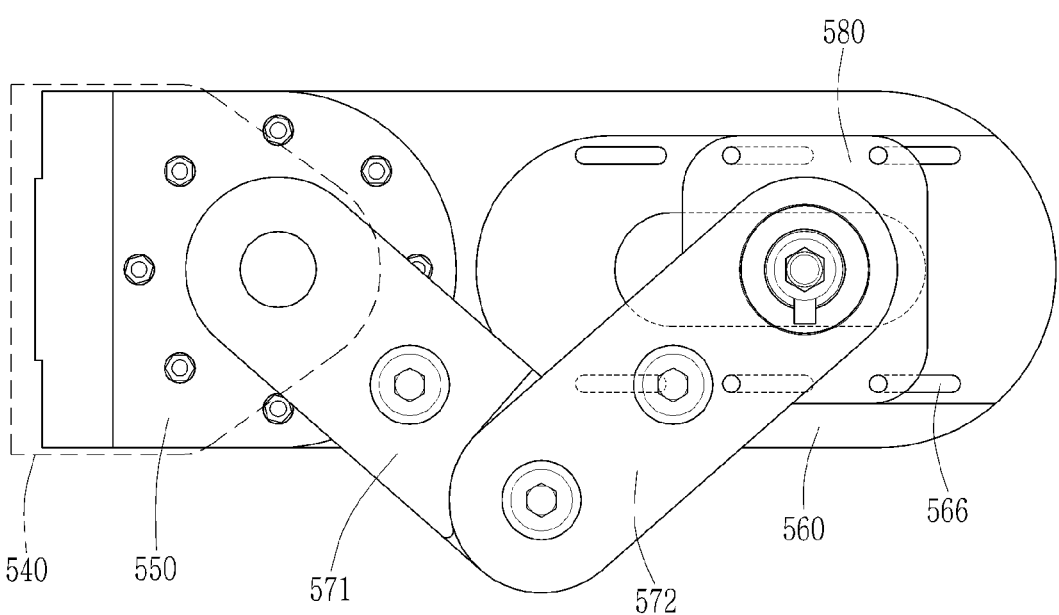
FIG. 7 is a top view showing a pivot angle and length adjustment structure in the improved two-hole core drilling machine according to the exemplary embodiment of the present invention.
Figure 8:
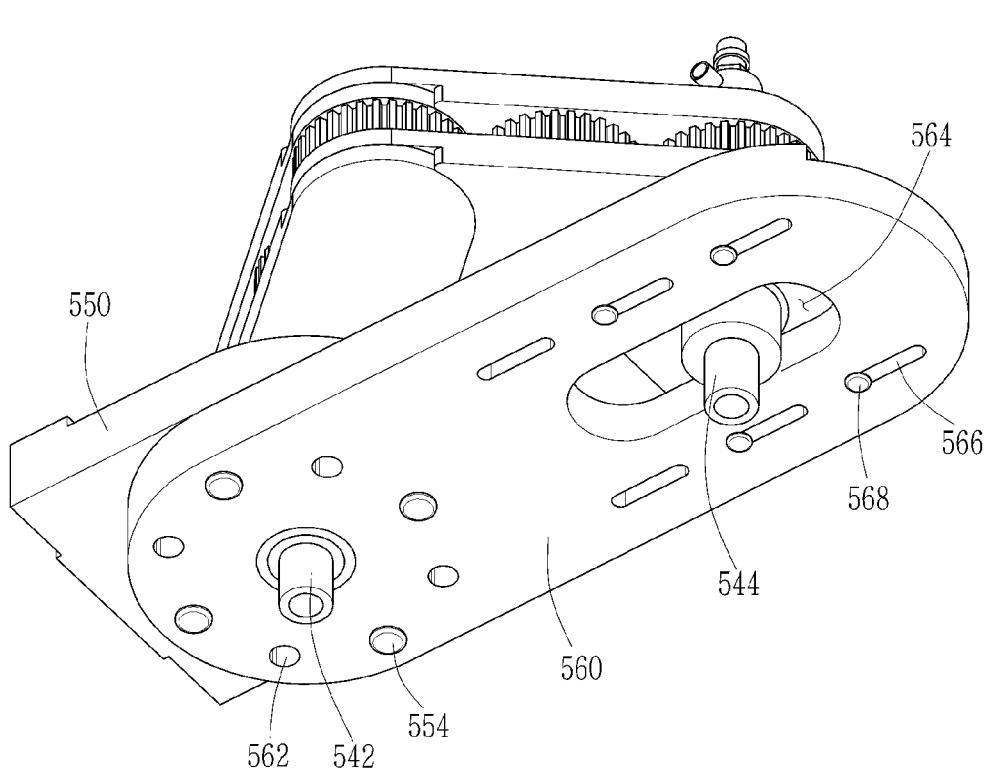
FIG. 8 is a partial bottom perspective view corresponding to FIG. 7 in a state in which two core bits are omitted.
Figure 9:
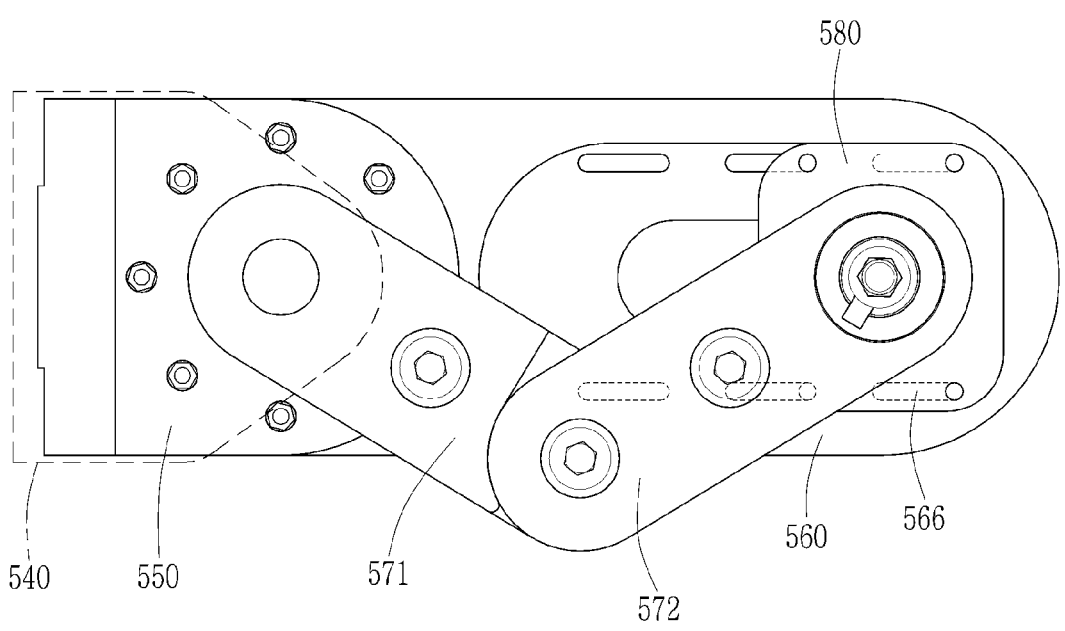
FIG. 9 is a top view showing a state in which a moving plate is coupled to a fixing plate after moving with respect to the fixing plate from a state of FIG. 7.

FIG. 5 is a perspective view schematically showing an improved two-hole core drilling machine according to an exemplary embodiment of the present invention. FIG. 6 is a partial perspective view showing a structure configured to adjust the distance between two core bits and a rotation force transmission structure in the improved two-hole core drilling machine according to the exemplary embodiment of the present invention. FIG. 7 is a top view showing a pivot angle and length adjustment structure in the improved two-hole core drilling machine according to the exemplary embodiment of the present invention. FIG. 8 is a partial bottom perspective view corresponding to FIG. 7 in a state in which two core bits are omitted. FIG. 9 is a top view showing a state in which a moving plate is coupled to a fixing plate after moving with respect to the fixing plate from a state of FIG. 7.

The two-hole core drilling machine according to the exemplary embodiment of the present invention, which is designated by reference numeral "500", includes a base 510 fixed to a structure to be drilled, a stand 520 vertically coupled to the base 510 and formed with a rack 522 at one side surface thereof, a vertically reciprocating carriage 530 provided with a pinion engaged with the rack 522 and vertically reciprocably mounted to the stand 520, a motor 540 coupled to one side surface of the carriage 530, a fixing plate 550 coupled to one side of a lower portion of the carriage 530, to rotatably support a drive shaft 542 of the motor 540, a pivoting plate 560 fastened to the fixing plate 550 under the condition that a pivot angle of the pivoting plate 560 is changed, and a moving plate 580 fastened to the pivoting plate 560 under the condition that a distance of the moving plate 580 from the fixing plate 550 is varied, and provided with a driven shaft 544 rotatably mounted thereto. The two-hole core drilling machine 500 also includes a drive force transmission (for example, a gear train) (in the following description, referred to as the "gear train" for convenience of description) 570 coupled between the drive shaft 542 and the driven shaft 544, to transmit rotation force of the drive shaft 542 to the driven shaft 544, a first core bit 590 coupled to the drive shaft 542, and a second core bit 590 coupled to the driven shaft 544.

Among the constituent elements of the two-hole core drilling machine 500 according to the exemplary embodiment of the present invention, the base 510 and the stand 520 may be collectively referred to as a "body".

The two-hole core drilling machine 500 is a core drilling machine configured to drill a hole into a horizontal bottom, a wall, or an inclined or curved surface having various shapes in a concrete structure.

The base 510 may be provided with at least one pair of anchor bolts 512 and, as such, may be fixed to a surface of a structure. In addition, the base 510 may be provided with at least one pair of wheels 514 and, as such, the entirety of the drilling machine 500 may be easily movable.

The stand 520 is vertically coupled to the base 510. The stand 520 may be formed to have a rectangular column shape. A connecting frame 516 may be coupled between a middle portion of the stand 520 and the base 510, to support the stand 520 with respect to the base 510. The rack 522 may be formed at one side surface of the stand 520, to vertically reciprocate the carriage 530 mounted to the stand 520.

The carriage 530 may be provided therein with the pinion (not shown) engaged with the rack 522 and, as such, may be vertically reciprocably mounted to the stand 520. The carriage 530 may be provided with a lever 535 configured to rotate the pinion. Accordingly, upon operating the drilling machine 500, the operator may rotate the lever 535, thereby vertically reciprocating the carriage 530. In addition, guide grooves 524 may be formed at opposite side surfaces of the stand 520, respectively, to guide and support vertical reciprocation of the carriage 530.

The motor 540 may be coupled to an upper portion of one side surface of the carriage 530, and the fixing plate 550 may be coupled to a lower portion of the side surface of the carriage 530. The motor 540 may be an electric motor, and the drive shaft 542 thereof may be rotatably supported by a bearing (not shown) mounted to the fixing plate 550.

The pivoting plate 560 may be mounted to a lower surface of the fixing plate 550 such that the pivoting plate 560 is pivotable about the drive shaft 542. The pivoting plate 560 may be fixed to the fixing plate 550 by fasteners 554 under the condition that a pivot angle of the pivot plate 560 is changed.

In addition, the moving plate 580 may be firmly fastened to the pivoting plate 560 under the condition that a relative position of the moving plate 5800 with respect to the pivoting plate 560 is varied, in order to vary a distance between the moving plate 580 and the fixing plate 550. The driven shaft 544 may be rotatably mounted at a through hole formed at a center of the moving plate 580.

The gear train 570 may be connected between the drive shaft 542 and the driven shaft 544, to transmit rotation force of the drive shaft 542 to the driven shaft 544. The gear train 570 may be constituted by two link brackets and five gears. A concrete configuration of the gear train 570 will be described later. A drive gear 575 may be coupled to the drive shaft 542, and a driven gear 579 may be coupled to the driven shaft 544, and, as such, the motor 540 may simultaneously rotate the drive shaft 542 and the driven shaft 544. As shown in FIG. 8, the driven shaft 544 may be disposed to pass through a shaft hole 564 formed through a central portion of the pivoting plate 560 at one side of the pivoting plate 560 in the form of a large slot.

The first core bit 590 may be coupled to a lower end of the drive shaft 542, and the second core bit 590 may be coupled to a lower end of the driven shaft 544. The first core bit 590 and the second core bit 590 may have the same size. However, two core bits having various sizes may be coupled to the drive shaft 542 and the driven shaft 544, respectively.

In the two-hole core drilling machine 500 according to the exemplary embodiment of the present invention, the first core bit 590 and the second core bit 590 may be fixed in a state in which pivot angle positions of the first core bit 590 and the second core bit 590 with respect to the base 510 and a relative distance between the first core bit 590 and the second core bit 590 are adjusted. Thus, the two-hole core drilling machine 500 may simultaneously drill two holes in a state in which a relative pivot angle and a relative distance between the two holes is appropriately adjusted.

The fixing plate 550 may be formed to take the form of a rectangular plate having an arc shape at one side thereof. Linear sides of the fixing plate 550 may be coupled to the carriage 530 and, as such, the fixing plate 550 may be vertically reciprocable together with the carriage 530. The fixing plate 550 may be provided with a plurality of fastening holes arranged on a circumference having a predetermined radius from the drive shaft 542.

The pivoting plate 560 may be provided with a plurality of fastening holes 562 extending vertically through the pivoting plate 560. The plurality of fastening holes 562 of the pivoting plate 560 may be formed at positions corresponding to the plurality of fastening holes of the fixing plate 550, respectively. The pivoting plate 560 may be formed to take the form of a rectangular plate having an arc shape at both shorter sides thereof.

The moving plate 580 may be formed to take the form of a substantially-square plate chamfered at four corners thereof. A guide groove 561 may be formed in a longitudinal direction at an upper surface of the pivoting plate 560, to guide movement of the moving plate 580 seated therein.

A protrusion (not shown) may be formed at one side of a lower surface of the moving plate 580 contacting the guide groove 561. A groove (not shown), which engages with the protrusion, thereby allowing stable movement of the moving plate 580 while preventing separation of the moving plate 580, may be formed at the pivoting plate 560.

It may be possible to fix the pivoting plate 560 at a predetermined pivot position with respect to the fixing plate 550 by fastening the fasteners 554 through the plurality of fastening holes of the fixing plate 550 and the plurality of fastening holes 562 of the pivoting plate 560. In the case in which eight fastening holes 562 are formed at the pivoting plate 560, as shown in FIG. 8, it may be possible to firmly fasten fasteners 554 at positions where the pivoting plate 560 is pivoted with respect to the fixing plate 550 through 45°, respectively.

As shown in FIGS. 6 to 8, the pivoting plate 560 may be provided with a plurality of slits 566 formed lengthily in a longitudinal direction, and the moving plate 580 may be provided with a plurality of fastening holes 582 extending vertically through the moving plate 580. In the shown embodiment, three pairs of slits 566 may be formed at the pivoting plate 560, and three pairs of fastening holes 582 may be formed at the moving plate 580.

As shown in FIG. 6, the gear train 570 may include a first link bracket 571 pivotably mounted to the drive shaft 542, a second link bracket 572 pivotably connected, at one end thereof, to the first link bracket 571 while being pivotably mounted, at the other end thereof, to the driven shaft 544, the drive gear 575 coupled to the drive shaft 542, to be rotatable by the drive shaft 542, a first intermediate gear 576 mounted to the first link bracket 571 while engaging with the drive gear 575, a second intermediate gear 577 mounted to connection portions of the first link bracket 571 and the second link bracket 572 while engaging with the first intermediate gear 576, a third intermediate gear 578 mounted to the first link bracket 571 while engaging with the second intermediate gear 577, and the driven gear 579 coupled to the driven shaft 544 while engaging with the third intermediate gear 578, to be rotatable by the third intermediate gear 578.

The first link bracket 571 may be disposed over and under three gears, and rotation shafts of the three gears may be mounted to the first link bracket 571. The first link bracket 571 may be formed to take the form of a pair of rectangular plates each having a semicircular shape at both shorter sides thereof. One side of the first link bracket 571 may be pivotably mounted to the drive shaft 541.

The second link bracket 572 may also be formed to take the form of a pair of rectangular plates each having a semicircular shape at both shorter sides thereof. Rotation shafts of three gears may be mounted between the pair of second link brackets 572. Other-side portions of the pair of first link brackets 571 and one-side portions of the pair of second link brackets 572 may be formed to have a thickness reduced by half, thereby forming steps, respectively, and, as such, may be interconnected to be pivotable with respect to each other about a rotation shaft of the second intermediate gear 577.

The drive gear 575 may be coupled to the drive shaft 542 rotated by the motor 540 and, as such, may rotate together with the drive shaft 542.

The first intermediate gear 576 may be rotatably mounted between middle portions of the pair of first link brackets 571, and may engage with the drive gear 575 and, as such, may be rotated.

The second intermediate gear 577 may be mounted between the connection portions of the first link bracket 571 and the second link bracket 572, and may engage with the first intermediate gear 576 and, as such, may be rotated.

The third intermediate gear 578 may be mounted between the middle portions of the pair of second link brackets 572, and may engage with the second intermediate gear 577 and, as such, may be rotated.

The driven gear 579 may be coupled to the driven shaft 544 mounted to the other-side portions of the pair of second link brackets 572, and may engage with the third intermediate gear 578 and, as such, may be rotated.

As shown in FIG. 9, it may be possible to fix the moving plate 580 by slightly unfastening the fasteners 568 fastened to the slits 566 of the moving plate 560 and the fastening holes 582 of the moving plate 580, moving the moving plate 580 rightwards, and then again fastening the fasteners 568. In this case, the moving plate 580 may be fixed at a position farther from the fixing plate 550, as compared to the case of FIG. 7. In this case, the angle between the first link bracket 571 and the second link bracket 572 may be fixed in a slightly diverged state.

Meanwhile, as shown in FIG. 5, water supply hoses 595 may be connected to a side surface of a middle portion of the drive shaft 542 and a side surface of an upper portion of the driven shaft 544, respectively, to supply cooling water. That is, the core drilling machine 500 according to the exemplary embodiment of the present invention may be a wet core drilling machine configured to drill holes by simultaneously rotating core bits while supplying water.

The water supply hoses 595 are detachably connected to a water supply pipe provided with a valve, and may be connected in parallel in order to supply water along channels communicating with interiors of respective core bits 590 after passing through interiors of the drive shaft 542 and the driven shaft 544. Since the distance between the drive shaft 542 and the driven shaft 544 is variable, the water supply hoses 595 connected between the drive shaft 542 and the driven shaft 544 may be formed of a flexible material and may be connected while having a sufficient length.

In accordance with the two-hole core drilling machine of the exemplary embodiment of the present invention, it may be possible to simultaneously drill two holes by simultaneously rotating the two core bits.

In addition, the relative pivot angle between the two core bits and the distance between the two core bits may be adjusted and, as such, it may be possible to easily simultaneously drill two holes while appropriately adjusting the distance between the two holes to be drilled within a predetermined range.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The afore-mentioned embodiments are the result of the elements and characteristics of the present invention being combined in a specific form. Each of the elements or characteristics needs to be considered to be optional unless explicitly described otherwise. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with corresponding elements or characteristics of the other embodiment. It is evident that in the claims, one or more embodiments may be constructed by combining claims not having an explicit citation relation or may be included as one or more new claims by amendment after filing an application.

INDUSTRIAL APPLICABILITY

The two-hole core drilling machine is industrially applicable for pulling-down and repair of a construction in a construction site.

The invention claimed is:

1. A two-hole core drilling machine comprising:

a body;

a vertically reciprocating carriage vertically reciprocally mounted to the body;

a fixing plate coupled to one side of the carriage, to rotatably support a drive shaft of a motor;

a pivoting plate fastened to the fixing plate under a condition that a pivot angle of the pivoting plate is changed;

a moving plate fastened to the pivoting plate under a condition that a distance of the moving plate from the fixing plate is varied, a driven shaft being rotatably mounted to the moving plate;

a gear train coupled between the drive shaft and the driven shaft, to transmit rotation force of the drive shaft to the driven shaft;

a first core bit coupled to the drive shaft; and a second core bit coupled to the driven shaft.

2. The two-hole core drilling machine according to claim 1, wherein:

the fixing plate comprises a plurality of fastening holes arranged on a circumference having a predetermined radius from the drive shaft;

the pivoting plate comprises a plurality of fastening holes extending vertically through the pivoting plate; and the pivoting plate is fixed at a predetermined pivot position with respect to the fixing plate by fasteners fastened through the plurality of fastening holes of the fixing plate and the plurality of fastening holes of the pivoting plate.

3. The two-hole core drilling machine according to claim 2, wherein:

the pivoting plate comprises a plurality of slots formed along a length in a longitudinal direction;

the moving plate comprises a plurality of fastening holes formed to extend vertically through the moving plate; and the moving plate is fixed at a predetermined position in a longitudinal direction with respect to the pivoting plate by fasteners fastened to the plurality of fastening holes and the plurality of slits.

4. The two-hole core drilling machine according to claim 3, wherein water supply hoses are connected to a middle portion of the drive shaft and an upper portion of the driven shaft, respectively, to supply cooling water.

5. The two-hole core drilling machine according to claim 1, wherein the gear train comprises:

a first link bracket pivotably mounted to the drive shaft;

a second link bracket pivotably connected, at one end thereof, to the first link bracket while being pivotably mounted, at another end thereof, to the driven shaft;

a drive gear coupled to the drive shaft, to be rotatable by the drive shaft;

a first intermediate gear mounted to the first link bracket while engaging with the drive gear;

a second intermediate gear mounted to connection portions of the first link bracket and the second link bracket while engaging with the first intermediate gear;

a third intermediate gear mounted to the first link bracket while engaging with the second intermediate gear; and a driven gear coupled to the driven shaft while engaging with the third intermediate gear, to be rotatable by the third intermediate gear.

6. The two-hole core drilling machine according to claim 1, wherein:

the body comprises:

a base fixed to a structure to be drilled; and a stand vertically coupled to the base and formed with a gear at one side surface thereof.

7. The two-hole core drilling machine according to claim 1, wherein the carriage is provided with a pinion engaged with a gear, and is vertically reciprocally mounted to a stand.

8. The two-hole core drilling machine according to claim 1, wherein the carriage is vertically reciprocally mounted to a stand by a hydraulic cylinder.

9. The two-hole core drilling machine according to claim 1, wherein a guide groove configured to guide movement of the moving plate is formed at an upper surface of the pivoting plate.

* * * * *